US012399338B2

(12) United States Patent
Sahoo et al.

(10) Patent No.: US 12,399,338 B2
(45) Date of Patent: Aug. 26, 2025

(54) METHOD OF RING MARKING OF AN OPTICAL FIBER AND OPTICAL FIBER THEREOF

(71) Applicant: Sterlite Technologies Limited, Aurangabad (IN)

(72) Inventors: Kishore Chandra Sahoo, Aurangabad (IN); Atul Mishra, Aurangabad (IN); Vishnu Rajsekar, Aurangabad (IN); Sashanka Some, Aurangabad (IN); Sravan Kumar, Aurangabad (IN); Parag Gawande, Aurangabad (IN); Mahesh Deshpande, Aurangabad (IN); Venkatesh Murthy, Aurangabad (IN)

(*) Notice: Subject to any disclaimer, the term of this patent is extended or adjusted under 35 U.S.C. 154(b) by 0 days.

(21) Appl. No.: 17/256,018

(22) PCT Filed: Oct. 25, 2019

(86) PCT No.: PCT/IN2019/050788
§ 371 (c)(1),
(2) Date: Dec. 24, 2020

(87) PCT Pub. No.: WO2020/084640
PCT Pub. Date: Apr. 30, 2020

(65) Prior Publication Data
US 2021/0364724 A1   Nov. 25, 2021

(30) Foreign Application Priority Data
Oct. 25, 2018  (IN) .............................. 201821040307

(51) Int. Cl.
*G02B 6/44* (2006.01)
(52) U.S. Cl.
CPC .................................. *G02B 6/4482* (2013.01)
(58) Field of Classification Search
CPC ...................................................... G02B 6/4482
USPC .......................................................... 385/128
See application file for complete search history.

(56) References Cited

U.S. PATENT DOCUMENTS

| 5,379,363 | A  | * | 1/1995 | Bonicel | ................ | G02B 6/4482 |
|---|---|---|---|---|---|---|
|  |  |  |  |  |  | 385/114 |
| 2004/0022499 | A1 | * | 2/2004 | Shimizu | ................. | G02B 6/138 |
|  |  |  |  |  |  | 264/1.24 |

FOREIGN PATENT DOCUMENTS

WO   WO-2015174182 A1 * 11/2015 ......... G02B 6/02042

* cited by examiner

*Primary Examiner* — Jerry M Blevins
(74) *Attorney, Agent, or Firm* — Steven R. Fairchild

(57) ABSTRACT

The present disclosure provides a method of single ring marking of an optical fiber. The method includes a first step of marking a first single ring marking of the optical fiber. In addition, the method includes a second step of marking a second single ring marking of the optical fiber. Further, the present disclosure provides a method of double ring marking of an optical fiber. Furthermore, the method includes a first step of marking a first ring marking, a second step of marking a second ring marking and a third step of marking a third ring marking.

10 Claims, 2 Drawing Sheets

METHOD OF RING MARKING OF AN OPTICAL FIBER AND OPTICAL FIBER THEREOF

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

Field of the Invention

The present disclosure relates to the field of optical fiber transmission. More particularly, the present disclosure relates to a method of ring marking of an optical fiber and an optical fiber thereof.

Description of the Related Art

Over the last few years, optical fibers are widely used for communication. These optical fibers are used in optical fiber cables. There is a need to distinguish each optical fiber in an optical fiber cable with high number of optical fibers. Typically, the optical fibers are ring marked in order to distinguish the optical fibers based on the number of fibers present in the cable. However, the ring marking over optical fiber creates stress at discrete areas in optical fiber which result in induced losses in optical fiber. It increases the attenuation in optical fiber during climatic changes especially negative temperatures.

Therefore, there is need of a method of ring marking on the optical fiber such that the attenuation caused by the ring marking on the optical fiber can be reduced.

BRIEF SUMMARY OF THE INVENTION

In an aspect, the present disclosure provides a method of single ring marking of an optical fiber. The method includes a first step of marking a first single ring marking on the optical fiber. In addition, the first single ring marking includes a first part of ring and a second part of ring. Further, the first part of ring and the second part of ring has width in range of about 700 microns to 732 microns. Furthermore, the first part of the first single ring marking and the second part of the first single ring marking are separated by distance of about 900 microns. Moreover, the first single ring marking has width in range of about 2.3 millimeters to 2.5 millimeters. The method includes a second step of marking a second single ring marking. In addition, the second single ring marking includes another first part and a second part. Further, the first part of second single ring marking and the second part of second single ring marking has a width in range of about 700 microns to 732 microns. Furthermore, the first part of second single ring marking and the second part of second single ring marking of the second ring marking are separated by a distance of about 900 microns. Moreover, the second ring marking has width in range of about 2.3 millimeters to 2.5 millimeters.

In another aspect, the present disclosure provides a method of ring marking of an optical fiber. The method includes a first step of applying a first coating layer on the optical fiber. In addition the first coating layer is a color/transparent coating layer. The method includes another step of applying ring marking on the first coating layer of the optical fiber along the length of the optical fiber. Further, the method includes yet another step of applying a second coating layer on the first coating layer along with ring marking. The second coating layer is a color coating layer. The diameter of the optical fiber is about 200 micron. The first coating layer has a thickness in a range of about 1.5 micron to 3 micron. The second coating layer has a thickness in a range of about 1.5 micron to 3 micron. The overall diameter of the optical fiber with the first coating layer, the ring marking and the second coating layer is about 212 micron. The ring marking is applied in between the first coating layer and the second coating layer of the optical fiber to reduce the attenuation loss of the optical fiber which occurs during the ring marking process.

A primary object of the present disclosure is to provide an optical fiber with ring marking.

Another object of the present disclosure is to provide an optical fiber with single ring marking.

Another object of the present disclosure is to provide an optical fiber with double ring marking.

Another object of the present disclosure is to provide a method of ring marking of the optical fiber in between two coating layers to prevent increase of attenuation.

Yet another object of the present disclosure is to provide the method of ring marking of the optical fiber in such a manner that it reduces stress on the optical fiber during ring marking.

In an embodiment of the present disclosure, the optical fiber includes a core, a cladding, and a first coating layer. The first coating layer is applied on the optical fiber. The first coating layer surrounds the cladding.

In an embodiment of the present disclosure, the first single ring marking and the second single ring marking are separated by distance of about 47.7 millimeters from inner ends. The first single ring marking and the second single ring marking are separated by distance of about 52.2 millimeters from outer ends.

In an embodiment of the present disclosure, the first single ring marking and the second single ring marking are marked along a longitudinal length of the optical fiber.

In another aspect, the present disclosure provides a method of double ring marking of an optical fiber. The method includes a first step of marking a first ring marking. In addition, the first ring marking includes a first part and a second part. Further, the first part of the first ring marking and the second part of the first ring marking has a width in range of about 755 microns to 808 microns or about 732 microns to 770 microns. Furthermore, the first part of first ring marking and the second part of the first ring marking are separated by a distance of about 859 microns or 912 microns. Moreover, the first ring marking has width of about 2.432 millimeters or 2.385 millimeters.

The method includes a second step of marking a second ring marking. In addition, the second ring marking includes a first part and a second part. Further, the first part of the second ring marking and the second part of the second ring marking has a width in range of about 755 microns to 808 microns or about 732 microns to 770 microns. Furthermore, the first part of the second ring marking and the second part of the second ring marking are separated by a distance of about 859 microns or 912 microns. Moreover, the second ring marking has a width of about 2.432 millimeters or 2.385 millimeters. The method includes a third step of marking a third ring marking. In addition, the third ring marking includes a first part of the third ring marking and a second part of the third ring marking. Further, the first part of the third ring marking and the second part of the third ring marking has a width in range of about 755 microns to 808 microns or about 732 microns to 770 microns. Furthermore, the first part of the third ring marking and the second part of the third ring marking are separated by a distance of about 859 microns or 912 microns. Moreover, the third ring marking has a width of about 2.432 millimeters or 2.385 millimeters. The method includes a fourth step of marking a fourth ring marking. In addition, the fourth ring marking includes a first part of the fourth ring marking and a second part of the fourth ring marking. Further, the first part of fourth ring marking and the second part of fourth ring marking has a width in range of about 755 microns to 808 microns or about 732 microns to 770 microns. Furthermore, the first part of fourth ring marking and the second part of the fourth ring marking are separated by a distance of about 859 microns or 912 microns. Moreover, the fourth ring marking has width of about 2.432 millimeters or 2.385 millimeters.

In an embodiment of the present disclosure, the first ring marking and the second ring marking are separated by distance of about 3.395 millimeters or 3.146 millimeters from inner ends. The first ring marking and the second ring marking are separated by distance of about 8.25 millimeters from outer ends.

In an embodiment of the present disclosure, the third ring marking and the fourth ring marking are separated by distance of about 3.395 millimeters or 3.146 millimeters from inner ends. The third ring marking and the fourth ring marking are separated by distance of about 8.25 millimeters from outer ends.

In an embodiment of the present disclosure, the first ring marking and the fourth ring marking are separated by distance of about 58.25 millimeters or 58.32 millimeters from outer ends. The second ring marking and the third ring marking are separated by distance of about 41.89 millimeters or 42.18 millimeters from inner ends.

In an embodiment of the present disclosure, the first ring marking, the second ring marking, the third ring marking, and the fourth ring marking are marked along a longitudinal length of the optical fiber. In an aspect, the present disclosure provides a method of ring marking of an optical fiber. The method includes a first step of applying a first coating layer on the optical fiber. In addition, the first coating layer is a color/transparent coating layer. The method includes another step of applying ring marking on the first coating layer of the optical fiber along the length of the optical fiber. Further, the method includes yet another step of applying a second coating layer on the first coating layer along with ring marking. The second coating layer is a color coating layer. The diameter of the optical fiber is about 200 micron. The first coating layer has a thickness in a range of about 1.5 micron to 3 micron. The second coating layer has a thickness in a range of about 1.5 micron to 3 micron. The overall diameter of the optical fiber with the first coating layer, the ring marking and the second coating layer is about 212 micron. The ring marking is applied in between the first coating layer and the second coating layer of the optical fiber to reduce the induced loss in the optical fiber which occurs during ring marking process.

DESCRIPTION OF THE DRAWINGS

In order to best describe the manner in which the above-described embodiments are implemented, as well as define other advantages and features of the disclosure, a more particular description is provided below and is illustrated in the appended drawings. Understanding that these drawings depict only exemplary embodiments of the invention and are not therefore to be considered to be limiting in scope, the examples will be described and explained with additional specificity and detail through the use of the accompanying drawings in which.

Figure 1:
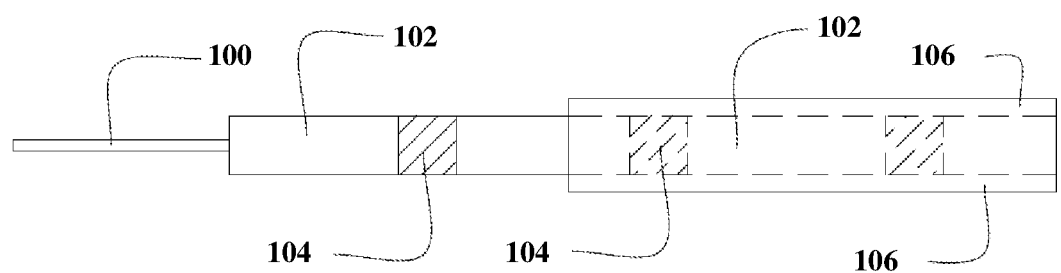
FIG. 1 illustrates a side view of an optical fiber with ring marking, in accordance with various embodiments of the present disclosure.

It should be noted that the accompanying figures are intended to present illustrations of few exemplary embodiments of the present disclosure. These figures are not intended to limit the scope of the present disclosure. It should also be noted that accompanying figures are not necessarily drawn to scale.

REFERENCE NUMERALS IN THE DRAWINGS

For a more complete understanding of the present invention parts, reference is now made to the following descriptions:

100. Optical fiber.
102. First coating layer.
104. Ring marking.
106. Second coating layer.
200. Side view.
202. Optical fiber.
204. First single ring marking.
206. Second single ring marking.
300. Side view.
302. Optical fiber.
304. First ring marking.
306. Second ring marking.
308. Third ring marking.
310. Fourth ring marking.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

FIG. 1 illustrates a side view of an optical fiber 100 with ring marking, in accordance with various embodiments of the present disclosure. The optical fiber 100 is a fiber used for transmitting information as light pulses from one end to another. In addition, the optical fiber 100 is a thin strand of glass or plastic capable of transmitting optical signals. The optical fiber 100 is configured to transmit large amount of information over long distances with relatively low attenuation. Further, the optical fiber 100 includes a core region and a cladding region. The core region is an inner part of the optical fiber 100 and the cladding section is an outer part of the optical fiber 100. Moreover, the core region is defined by a central longitudinal axis of the optical fiber 100. In addition, the cladding region surrounds the core region. The core region and the cladding region are formed along the central longitudinal axis of the optical fiber 100. Moreover, the core region and the cladding region are formed during the manufacturing stage of the optical fiber 100. The core region has a refractive index which is greater than a refractive index of the cladding region. In an embodiment of the present disclosure, the core region has a higher refractive index than the cladding region. Also, the optical fiber 100 has diameter of about 200 micron. In an embodiment of the present disclosure, the diameter of the optical fiber may vary. In an embodiment of the present disclosure, the optical fiber is a natural fiber. In an embodiment of the present disclosure, the optical fiber 100 is a single mode optical fiber. In another embodiment of the present disclosure, the optical fiber is a multimode optical fiber.

The present disclosure provides a method of ring marking 104 of the optical fiber 100 to reduce stress on the optical fiber 100 during ring marking process. The stress on the optical fiber 100 during the ring marking process results in the increase of attenuation in the optical fiber 100. The method includes a first step of applying a first coating layer 102 on the optical fiber 100. In an embodiment of the present disclosure, the first coating layer 102 is a transparent layer. In another embodiment of the present disclosure, the first coating layer 102 is a colored layer. In addition, the first coating layer 102 is made of any suitable material. Further, the first coating layer 102 is characterized by a thickness. The thickness of the first coating layer 102 is in a range of about 1.5 micron to 3 micron. In an embodiment of the present disclosure, the thickness of the first coating layer 102 may vary.

The method includes another step of applying the ring marking 104 over a surface of the first coating layer 102. The ring marking 104 corresponds to a plurality of rings which are equally spaced along a longitudinal length of the optical fiber 100. The plurality of rings is applied over the first coating layer 102 of the optical fiber 100 along the length of the optical fiber 100. Each of the plurality of rings is uniformly spaced along the length of the optical fiber 100. In general, the ring marking 104 is done for the identification of the optical fiber 100. In an embodiment of the present disclosure, the ring marking 104 is done for the identification of the optical fiber 100 in high fiber count cables.

The method includes yet another step of applying a second coating layer 106 over the first coating layer 102 along with the ring marking 104. In an embodiment of the present disclosure, the second coating layer 106 is a colored layer. In another embodiment of the present disclosure, the second coating layer 106 is a transparent layer. In addition, the second coating layer 106 is made of any suitable material. Further, the second coating layer 106 is characterized by a thickness. The thickness of the second coating layer 106 is in a range of about 1.5 micron to 3 micron. In an embodiment of the present disclosure, the thickness of the second coating layer 106 may vary.

The optical fiber 100 with the ring marking 104 in between the first coating layer 102 and the second coating layer 106 has overall diameter of about 212 micron for 200 micron optical fiber 100. In an embodiment of the present disclosure, the overall diameter of the optical fiber 100 with the first coating layer 102 and the second coating layer 106 may vary. In an embodiment of the present disclosure, the ring marking 104 is done in between the first coating layer 102 and the second coating layer 106 to reduce the stress on the optical fiber 100 during ring marking process. The stress is reduced to enable decrease in attenuation in the optical fiber 100. Further, the first coating layer 102 on the optical fiber 100 avoids the direct stress on the optical fiber 100 during ring marking process which results in controlling the increase in attenuation of the optical fiber 100 during climatic change. In an embodiment of the present disclosure, the first coating layer 102, the ring marking 104 over the first coating layer 102 and the second coating layer 106 are applied over the optical fiber 100 simultaneously. The ring marking 104 in between the first coating layer 102 and the second coating layer 106 facilitates in the reduction of the attenuation during temperature change. Further, the ring marking 104 on the first coating layer 102 allows the distribution of pressure on the first coating layer 102 during ring marking process which reduces the direct stress on the optical fiber 100.

Figure 2:
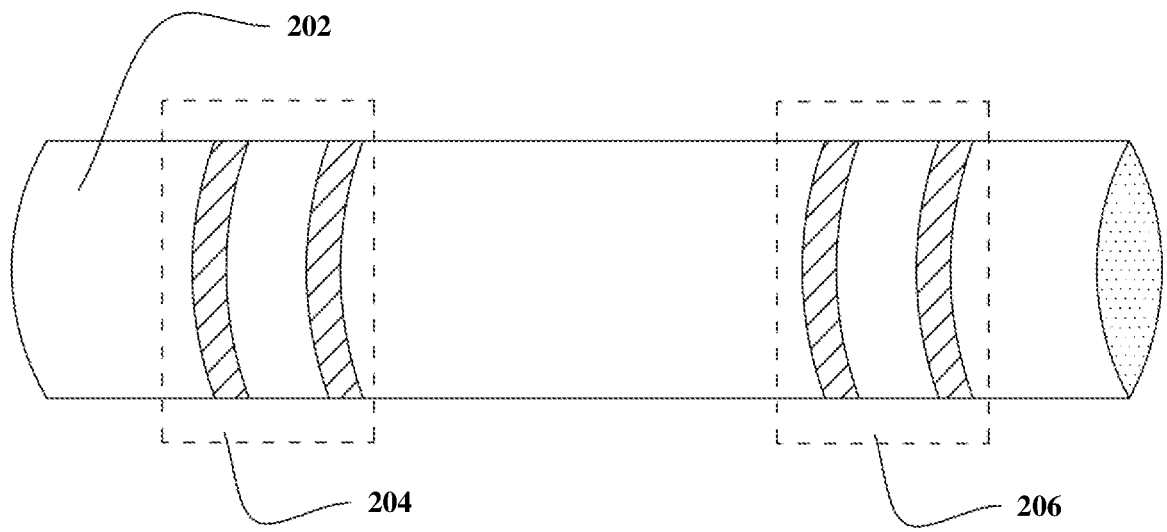
FIG. 2 illustrates a side view of single ring marking of an optical fiber, in accordance with various embodiments of the present disclosure.

FIG. 2 illustrates a side view 200 of single ring marking of an optical fiber 202, in accordance with various embodiments of the present disclosure. The optical fiber 202 is a fiber used for transmitting information as light pulses from one end to another. In addition, the optical fiber 202 is a thin strand of glass or plastic capable of transmitting optical signals. The optical fiber 202 is configured to transmit large amount of information over long distances with relatively low attenuation. Further, the optical fiber 202 includes a core, a cladding, and a first coating layer. The core is an inner part of the optical fiber 202 and the cladding is an outer part of the optical fiber 202. Moreover, the core is defined by a central longitudinal axis of the optical fiber 202. In addition, the cladding surrounds the core. The core and the cladding are formed along the central longitudinal axis of the optical fiber 202. Moreover, the core and the cladding are formed during the manufacturing stage of the optical fiber 202. The core has a refractive index which is greater than a refractive index of the cladding. In an embodiment of the present disclosure, the core has a higher refractive index than the cladding. The first coating layer surrounds the cladding to which a single ring marking is applied. In an embodiment of the present disclosure, the first coating layer is a transparent layer. In another embodiment of the present disclosure, the first coating layer is a colored layer. In addition, the first coating layer is made of any suitable material. Further, the first coating layer is characterized by a thickness. In an embodiment of the present disclosure, the optical fiber 202 is a natural fiber. In an embodiment of the present disclosure, the optical fiber 202 is a single mode optical fiber. In another embodiment of the present disclosure, the optical fiber 202 is a multimode optical fiber.

The present disclosure provides a method of the single ring marking of the optical fiber 202 to reduce stress on the optical fiber 202. The method includes a first step of marking a first single ring marking 204. In addition, the first single ring marking 204 includes a first part and a second part. Further, the first part of first single ring marking 204 and the second part of first single ring marking 204 has a width in range of about 700 microns to 732 microns. Furthermore, the first part of the first single ring marking 204 and the second part of the first single ring marking 204 are separated by a distance of about 900 microns. Moreover, the first single ring marking 204 has width in range of about 2.3 millimeters to 2.5 millimeters.

The method includes a second step of marking a second single ring marking 206. In addition, the second single ring marking 206 includes a first part and a second part. Further, the first part of the second single ring marking 206 and the second part of the second single ring marking 206 has a width in range of about 700 microns to 732 microns. Furthermore, the first part of the second single ring marking 206 and the second part of the second single ring marking 206 are separated by a distance of about 900 microns. Moreover, the second single ring marking 206 has a width in range of about 2.3 millimeters to 2.5 millimeters.

In addition, the first single ring marking 204 and the second single ring marking 206 are separated by distance of about 47.7 millimeters from inner ends. Further, the first single ring marking 204 and the second single ring marking 206 are separated by distance of about 52.2 millimeters from outer ends. Furthermore, the first single ring marking 204 and the second single ring marking 206 are marked along a longitudinal length of the optical fiber 202. In general, the single ring marking is done for the identification of the optical fiber 202. In an embodiment of the present disclosure, the single ring marking is done for the identification of the optical fiber 202 in high fiber count cables.

In an embodiment of the present disclosure, the single ring marking is done on the first coating layer to reduce the stress on the optical fiber 202. The stress is reduced to enable decrease in attenuation in the optical fiber 202. Further, the first coating layer on the optical fiber 202 avoids the direct stress on the optical fiber 202 during the single ring making process. Furthermore, the single ring making results in controlling the increase in attenuation of the optical fiber 202 during climatic change. Moreover, the single ring marking on the first coating layer allows the distribution of pressure which reduces the direct stress on the optical fiber 202. Also, the single ring marking on the first coating layer of the optical fiber 202 reduce consumption of ink due to reduction of point of application of ink.

Further, it may be noted that in FIG. 2, the single ring marking process includes two single ring markings; however, those skilled in the art would appreciate that more or less number of single ring markings is included in the single ring marking process.

Figure 3:
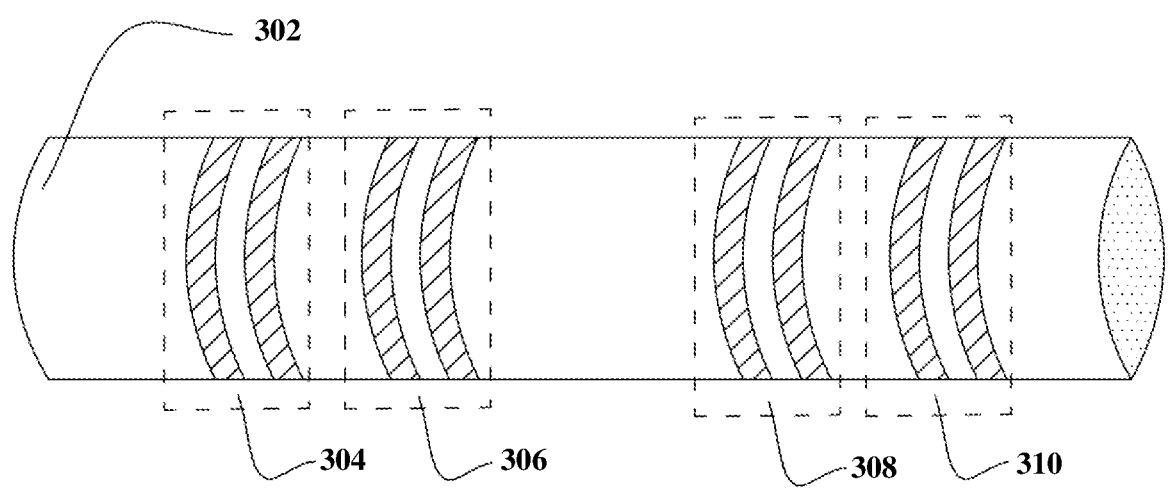
FIG. 3 illustrates a side view of double ring marking of an optical fiber, in accordance with various embodiments of the present disclosure.

FIG. 3 illustrates a side view 300 of double ring marking of an optical fiber 302, in accordance with various embodiments of the present disclosure. The optical fiber 302 is a fiber used for transmitting information as light pulses from one end to another. In addition, the optical fiber 302 is a thin strand of glass or plastic capable of transmitting optical signals. The optical fiber 302 is configured to transmit large amount of information over long distances with relatively low attenuation.

In an embodiment, the optical fiber 302 includes a core and a cladding. The core is an inner part of the optical fiber 302 and the cladding is an outer part of the optical fiber 302. Moreover, the core is defined by a central longitudinal axis of the optical fiber 302. In addition, the cladding surrounds the core. The core and the cladding are formed along the central longitudinal axis of the optical fiber 302. Moreover, the core and the cladding are formed during the manufacturing stage of the optical fiber 302. The core has a refractive index which is greater than a refractive index of the cladding. In an embodiment of the present disclosure, the core has a higher refractive index than the cladding.

In an embodiment of the present disclosure, the optical fiber 302 is a natural fiber. In another embodiment of the present disclosure, the optical fiber 302 is a single mode optical fiber. In yet another embodiment of the present disclosure, the optical fiber 302 is a multimode optical fiber.

The present disclosure provides a method of the double ring marking of the optical fiber 302 to reduce stress on the optical fiber 302. In an embodiment of the present disclosure, the method includes a first step of marking a first ring marking 304. In another embodiment of the present disclosure, the method includes the first step of marking the first ring marking 304. In addition, the first ring marking 304 includes a first part and a second part. In an embodiment of the present disclosure, the first part of the ring marking 304 and the second part of the ring marking 304 has a width in a range of about 755 microns to 808 microns or about 732 microns to 770 microns. In another embodiment of the present disclosure, the first part of the ring marking 304 and the second part of the ring marking 304 has a width in a range of about 732 microns to 770 microns. In an embodiment of the present disclosure, the first part of the ring marking 304 and the second part of the ring marking 304 are separated by a distance of about 859 microns or 912 microns. In another embodiment of the present disclosure, the first part of the ring marking 304 and the second part of the ring marking 304 are separated by a distance of about 912 microns. In an embodiment of the present disclosure, the first ring marking 304 has a width of about 2.385 millimeters. In another embodiment of the present disclosure, the first ring marking 304 has width of about 2.432 millimeters or 2.385 millimeters.

In an embodiment of the present disclosure, the method includes a second step of marking a second ring marking 306. In another embodiment of the present disclosure, the method includes the second step of marking the second ring marking 306. In addition, the second ring marking 306 includes a first part a second part. In an embodiment of the present disclosure, the first part of the second ring marking 306 and the second part of the second ring marking 306 has a width in range of about 755 microns to 808 microns or about 732 microns to 770 microns. In another embodiment of the present disclosure, the first part of the second ring marking 306 and the second part of the second ring marking 306 has a width in range of about 732 microns to 770 microns. In an embodiment of the present disclosure the first part of the second ring marking 306 and the second part of the second ring marking 306 are separated by a distance of about 859 microns or 912 microns. In another embodiment of the present disclosure, the first part of the second ring marking 306 and the second part of the second ring marking 306 are separated by a distance of about 912 microns. In an embodiment of the present disclosure, the second ring marking 306 has width of about 2.432 millimeters or 2.385 millimeters. In another embodiment of the present disclosure, the second ring marking 306 has width of about 2.385 millimeters.

In an embodiment of the present disclosure, the method includes a third step of marking a third ring marking 308. In another embodiment of the present disclosure, the method includes the third step of marking the third ring marking 308. In addition, the third ring marking 308 includes a first part and a second part. In an embodiment of the present disclosure, the first part of the third ring marking 308 and the second part of the third ring marking 308 has a width in a range of about 755 microns to 808 microns or about 732 microns to 770 microns. In another embodiment of the present disclosure, the first part of the third ring marking 308 and the second part of the third ring marking 308 has a width in a range of about 732 microns to 770 microns. In an embodiment of the present disclosure, the first part of the third ring marking 308 and the second part of the third ring marking 308 are separated by a distance of about 859 microns or 912 microns. In another embodiment of the present disclosure, the first part of the third ring marking 308 and the second part of the third ring marking 308 are separated by a distance of about 912 microns. In an embodiment of the present disclosure, the third ring marking 308 has a width of about 2.432 millimeters or 2.385 millimeters. In another embodiment of the present disclosure, the third ring marking 308 has a width of about 2.385 millimeters.

In an embodiment of the present disclosure, the method includes a fourth step of marking a fourth ring marking 310. In another embodiment of the present disclosure, the method includes the fourth step of marking the fourth ring marking 310. In addition, the fourth ring marking 310 includes a first part a second part. In an embodiment of the present disclosure, the first part of the fourth ring marking 310 and the second part of the fourth ring marking 310 has a width in range of about 755 microns to 808 microns or about 732 microns to 770 microns. In another embodiment of the present disclosure, the first part of the fourth ring marking 310 and the second part of the fourth ring marking 310 has a width in a range of about 732 microns to 770 microns. In an embodiment of the present disclosure, the first part of the fourth ring marking 310 and the second part of the fourth ring marking 310 are separated by a distance of about 859 microns or 912 microns. In another embodiment of the present disclosure, the first part of the fourth ring marking 310 and the second part of the fourth ring marking 310 are separated by a distance of about 912 microns. In an embodiment of the present disclosure, the fourth ring marking 310 has a width of about 2.432 millimeters or 2.385 millimeters. In another embodiment of the present disclosure, the fourth ring marking 310 has a width of about 2.385 millimeters.

In an embodiment of the present disclosure, the first ring marking 304 and the second ring marking 306 are separated by a distance of about 3.395 millimeters or 3.146 millimeters from inner ends. In another embodiment of the present disclosure, the first ring marking 304 and the second ring marking 306 are separated by a distance of about 3.146 millimeters from inner ends. In addition, the first ring marking 304 and the second ring marking 306 are separated by a distance of about 8.25 millimeters from outer ends. In an embodiment of the present disclosure, the third ring marking 308 and the fourth ring marking 310 are separated by a distance of about 3.395 millimeters or 3.146 millimeters from inner ends. In another embodiment of the present disclosure, the third ring marking 308 and the fourth ring marking 310 are separated by a distance of about 3.146 millimeters from inner ends. Further, the third ring marking 308 and the fourth ring marking 310 are separated by a distance of about 8.25 millimeters from outer ends.

In an embodiment of the present disclosure, the first ring marking 304 and the fourth ring marking 310 are separated by a distance of about 58.25 millimeters or 58.32 millimeters from outer ends. In another embodiment of the present disclosure, the first ring marking 304 and the fourth ring marking 310 are separated by a distance of about 58.32 millimeters from outer ends. In an embodiment of the present disclosure, the second ring marking 306 and the third ring marking 308 are separated by a distance of about 41.89 millimeters or 42.18 millimeters from inner ends. In another embodiment of the present disclosure, the second ring marking 306 and the third ring marking 308 are separated by a distance of about 42.18 millimeters from inner ends. In addition, the first ring marking 304, the second ring marking 306, the third ring marking 308, and the fourth ring marking 310 are marked along a longitudinal length of the optical fiber 302. In general, the double ring marking is done for the identification of the optical fiber 302. In an embodiment of the present disclosure, the double ring marking is done for the identification of the optical fiber 302 in high fiber count cables.

Further, it may be noted that in FIG. 3, the double ring marking process includes four ring marking; however, those skilled in the art would appreciate that more or less number of ring marking is included in the double ring marking process.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

Although the present disclosure has been explained in relation to its preferred embodiment(s) as mentioned above, it is to be understood that many other possible modifications and variations can be made without departing from the spirit and scope of the inventive aspects of the present invention. It is, therefore, contemplated that the appended claim or claims will cover such modifications and variations that fall within the true scope of the invention.

We claim:

1. An optical fiber comprising:
a first coating layer on the optical fiber;
a second coating layer on the first coating layer;
   a first single ring marking having a first part and a second part;
   wherein the first single ring marking having a first part and second part are formed between the first coating layer and the second coating layer of the optical fiber; wherein at least one of the first coating layer and the second coating layer is a colored layer; and wherein the first single ring marking has a width in a range of 2.3 millimeters to 2.5 millimeters, and
   wherein the first part of the first single ring marking and the second part of the first single ring marking has a width in a range of 700 microns to 732 microns,
   thereby, while forming the marking, pressure is distributed on the first coating layer that avoids direct stress on the optical fiber during ring marking process.

2. The optical fiber as claimed in claim 1, further comprising a second single ring marking, the second single ring marking including a first part of the second single ring marking and a second part of the second single ring marking, wherein at least one of:
   the first part of the second single ring marking and the second part of the second single ring marking are separated by distance of 900 microns, and
   the first part of the second single ring marking and the second part of the second single ring marking has a width in range of 700 microns to 732 microns; and
   wherein the second single ring marking has a width in a range of 2.3 millimeters to 2.5 millimeters.

3. An optical fiber comprising:
a first single ring marking having a first part and second part separated by a distance of 900 microns;
a second single ring marking separated from the first single ring marking by at least one of a distance of 47.7 millimeters from inner ends and by a distance of 52.2 millimeters from outer ends, a second single ring marking having a first part and second part separated by a distance of 900 microns, wherein the first single ring marking and the second single ring marking are between a first coating layer and a second coating layer of the optical fiber and are marked along a longitudinal length of the optical fiber.

4. The optical fiber as claimed in claim 3, wherein at least one of: the first coating layer is a color coating layer, the first coating layer is a transparent coating layer, the second coating layer is a color coating layer, the second coating layer is a transparent coating layer, wherein the first coating layer and the second the coating layer are different.

5. The optical fiber as claimed in claim 4 wherein at least one of:
   the first single ring marking and the second single ring marking are separated by a distance of 47.7 millimeters from inner ends, and
   the first single ring marking and the second ring marking are separated by a distance of 52.2 millimeters from outer ends.

6. The optical fiber as claimed in claim 4, wherein the first coating layer, the marking over the first coating layer and the second coating layer over the marking are applied over the optical fiber simultaneously.

7. The optical fiber as claimed in claim 4, wherein at least one of:
   the marking in between the first coating layer and the second layer facilitates in the reduction of the attenuation during temperature change,
   the marking on the first coating layer allows the distribution of pressure on the first coating layer during the marking process which reduces the direct stress on the optical fiber.

8. The optical fiber as claimed in claim 3, wherein at least one of: the first coating layer has a thickness in a range of 1.5 micron to 3 micron, the second coating layer has a thickness in a range of 1.5 micron to 3 micron.

9. The optical fiber as claimed in claim 3 wherein at least one of:
   the first single ring marking has a width in a range of 2.3 millimeters to 2.5 millimeters;
   the first part of the second single ring marking and the second part of the second single ring marking has a width in a range of 700 microns to 732 microns;
   wherein the second single ring marking has a width in a range of 2.3 millimeters to 2.5 millimeters.

10. An optical fiber comprising:
a first double ring marking comprising a first ring marking and a second ring marking, a second double ring marking comprising a third ring marking and a fourth ring marking, each of the first ring marking, the second ring marking, the third ring marking and the fourth ring marking having a first part and a second part;
   wherein the first double ring marking and the second double ring marking are between a first coating layer and a second coating layer of the optical fiber and are marked along a longitudinal length of the optical fiber; and
wherein at least one of:
the first ring marking and the second ring marking are separated by a distance of at least one of 3.395 millimeters and 3.146 millimeters from inner ends,
the first ring marking and the second ring marking are separated by a distance of 8.25 millimeters from outer ends;
the third ring marking and the fourth ring marking are separated by a distance of at least one of 3.395 millimeters and 3.146 millimeters from inner ends,
the third ring marking and the fourth ring marking are separated by a distance of 8.25 millimeters from outer ends;
the first ring marking and the fourth ring marking are separated by a distance of at least one of 58.25 millimeters and 58.32 millimeters from outer ends;
the second ring marking and the third ring marking are separated by a distance of at least one of 41.89 millimeters and 42.18 millimeters from inner ends.

* * * * *